United States Patent
Gray et al.

[11] Patent Number: 5,818,564
[45] Date of Patent: Oct. 6, 1998

[54] ASSEMBLY INCLUDING AN ACTIVE MATRIX LIQUID CRYSTAL DISPLAY MODULE

[75] Inventors: David C. Gray, Sunnyvale; Dana C. Chase, Jr., Cupertino, both of Calif.

[73] Assignee: Raychem Corporation, Menlo Park, Calif.

[21] Appl. No.: 713,909

[22] Filed: Sep. 13, 1996

[51] Int. Cl.$^6$ .............................................. G02F 1/1333
[52] U.S. Cl. ............................. 349/161; 349/58; 353/54; 353/52
[58] Field of Search ........................... 349/58, 149, 152, 349/154

[56] References Cited

U.S. PATENT DOCUMENTS

| | | | |
|---|---|---|---|
| 3,832,034 | 8/1974 | Edmonds | 350/160 LC |
| 4,682,857 | 7/1987 | Tang | 350/331 T |
| 4,832,781 | 5/1989 | Mears | 156/345 |
| 4,838,654 | 6/1989 | Hamaguchi et al. | 350/333 |
| 4,879,144 | 11/1989 | Nakura et al. | 428/1 |
| 4,910,579 | 3/1990 | Bowman et al. | 357/71 |
| 4,931,787 | 6/1990 | Shannon | 340/784 |
| 4,938,992 | 7/1990 | Mears | 427/38 |
| 4,997,606 | 3/1991 | Mears et al. | 264/102 |
| 5,005,951 | 4/1991 | Te Velda | 350/334 |
| 5,022,750 | 6/1991 | Flasck | 353/31 |
| 5,024,524 | 6/1991 | Flasck | 353/31 |
| 5,032,021 | 7/1991 | Kanatani et al. | 353/54 |
| 5,060,113 | 10/1991 | Jacobs | 361/386 |
| 5,060,114 | 10/1991 | Feinberg et al. | 361/387 |
| 5,108,172 | 4/1992 | Flasck | 353/31 |
| 5,170,194 | 12/1992 | Kurematsu et al. | 353/52 |
| 5,170,195 | 12/1992 | Akiyama et al. | 353/54 |
| 5,233,445 | 8/1993 | Kamath et al. | 359/51 |
| 5,504,605 | 4/1996 | Sakuma et al. | 359/83 |
| 5,514,906 | 5/1996 | Love et al. | 257/712 |
| 5,546,203 | 8/1996 | Takao | 359/49 |

FOREIGN PATENT DOCUMENTS

| | | | |
|---|---|---|---|
| 0 112 417 A1 | 7/1984 | European Pat. Off. | G02F 1/133 |
| 0 294 898 A2 | 12/1988 | European Pat. Off. | H04N 9/31 |
| 0507639 A2 | 10/1992 | European Pat. Off. | G02F 1/136 |
| 62-277789 | 12/1987 | Japan | H05K 3/20 |

OTHER PUBLICATIONS

Research Disclosure, "Reducing Temperature Gradients in LCD'S," No. 336, abstract No. 33660 (Apr. 1992).
Patent Abstract of Japan, vol. 014, No. 468 (P–114) (Oct. 1990) (abstract of Casio Computer, JP 02–186324 (1990).
Huntley, IBM Techn. Discl. Bull. vol. 23, No. 1, pp. 347–348 (Jun. 1980).
Garwin, IBM Techn. Discl. Bull. vol. 22, No. 8A, pp. 3447–3448 (Jan. 1980).

*Primary Examiner*—William L. Sikes
*Attorney, Agent, or Firm*—Herbert G. Burkard; Yuan Chao

[57] ABSTRACT

An assembly for dissipating heat from an active matrix liquid crystal display module while avoiding developing thermally induced mechanical stresses which can adversely affect the electro-optical properties of the liquid crystal material is disclosed. The module is affixed to a circuit board containing electrical leads for connection to drive electronics, in a way such that the substrate containing the active matrix elements is suspended through a window or through-hole in the circuit board and is sunken or nested into a soft elastomeric gel which is electrically non-conductive but thermally conductive. The gel provides the requisite thermal conductivity to dissipate the heat via a heat sink with which the gel is in thermal contact.

20 Claims, 4 Drawing Sheets

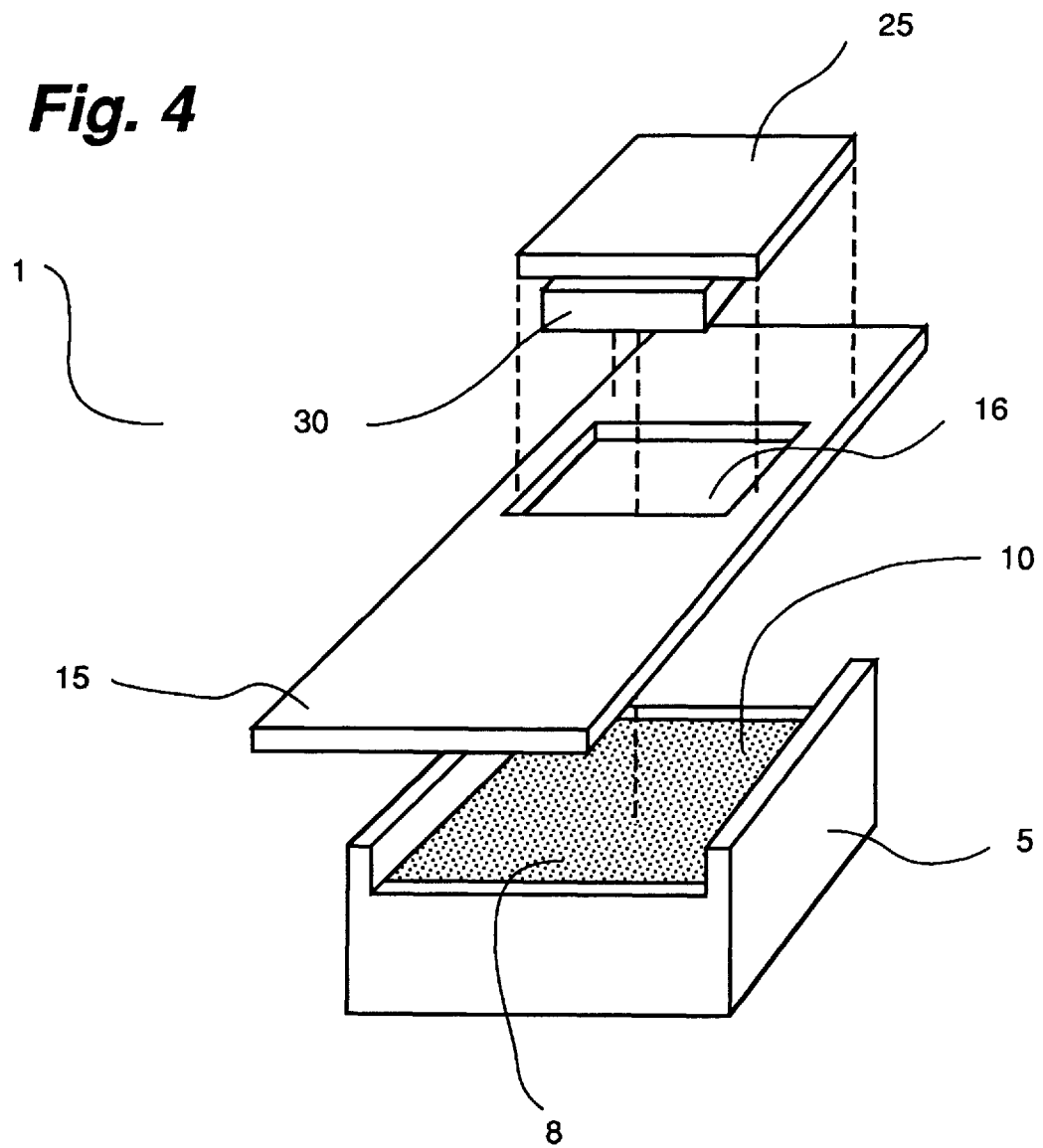

ASSEMBLY INCLUDING AN ACTIVE MATRIX LIQUID CRYSTAL DISPLAY MODULE

TECHNICAL FIELD OF THE INVENTION

This invention relates to an assembly including an active matrix driven liquid crystal display module, with particular emphasis on dissipating heat from and reducing mechanical stress in the module.

BACKGROUND OF THE INVENTION

High resolution, high speed liquid crystal displays for depicting graphical or linguistic information are composed of many pixels, each of which may be driven or controlled by an active matrix element such as a transistor. Illustrative publications relating to such displays include Edmonds, U.S. Pat. No. 3,832,034 (1974); Hamaguchi, U.S. Pat. No. 4,838,654 (1989); Bowman et la., U.S. 4,910,579 (1990); Shannon, U.S. Pat. No. 4,931,787 (1990); Te Velde, U.S. Pat. No. 5,005,951 (1991); Flasck, U.S. Pat. No. 5,022,750 (1991); Flasck, U.S. Pat. No. 5,024,524 (1991); Flasck, U.S. Pat. No. 5,108,172 (1992); Kamath et al., U.S. Pat. No. 5,233,445 (1993); IBM, EP 0,112,417 (1984); N. V. Philips, EP 0,294,898 (1988); Garwin, IBM Technical Disclosure Bulletin, Vol. 22, no. 8A, pp. 3447–8 (Jan. 1980); and Huntley, IBM Technical Disclosure Bulletin, Vol. 23, no. 1, pp. 347–8 (Jun. 1980).

The active matrix elements are disposed in an array, each element helping define a pixel and controlling the visual state of liquid crystal material associated therewith. Depending on the switching state of an active matrix element, a voltage (electric field) is applied or not to the liquid crystal material. In turn, the liquid crystal material is switched from one electro-optical state to another. For example, a pixel in the "field-on" state may permit incident light to be transmitted through the liquid crystal material and to be specularly reflected by a reflector positioned behind it, back towards the incidence side (albeit usually angularly displaced by operation of the laws of reflection), while a pixel in the "field-off" state may prevent such reflection by scattering or absorbing the light. The combination of many "on" and "off" pixels generates an image which can be viewed directly or projected onto a screen for viewing. By combining red, green and blue images, either via sequential illumination with red, green and blue light or via dedicated red, green and blue pixels, a colored image can be formed.

The operation of such displays generates heat which must be dissipated. The heat can arise from absorption of incident light (which is especially intense for projection displays) and/or electrical power consumption by the active matrix elements. The conventional way to dissipate heat is to adhesively bond the backside of the substrate containing the active matrix elements to a heat sink, such as a block of metal. However, as the local temperature fluctuates during the course of operation of the display, thermally induced mechanical stresses can develop in the substrate due to differences between its and the heat sink's coefficients of thermal expansion. The stresses can propagate to the liquid crystal material itself, which is confined between the backside substrate and a front-side substrate. Liquid crystal materials may be sensitive to such stresses and may have their electro-optical properties adversely affected.

SUMMARY OF THE INVENTION

Thus, it is desirable to effectively dissipate heat from a liquid crystal display module, while at the same avoiding the development of mechanical stresses in the liquid crystal material. The present invention presents a solution to the foregoing problem, in the form of an assembly comprising:

(a) a base having a cavity;
(b) a thermally conductive, electrically non-conductive gel material contained in the cavity;
(c) a circuit board having a window therein and plural electrical leads thereon, the circuit board being supported on the base and positioned such that the window lies above the gel material; and
(d) a liquid crystal display module, including
   (i) first and second substrates oriented in a generally face-to-face relationship, wherein the first substrate is transparent and has on its interior face a transparent electrode material electrically connected to an electrical lead on the circuit board and wherein the second substrate has on its interior face a plurality of active matrix elements and has plural bonding pads electrically connected to corresponding electrical leads on the circuit board; and
   (ii) liquid crystal material sandwiched between the first and second substrates;
wherein the first substrate is supported on the surface of the circuit board facing away from the base and wherein the second substrate passes through the window in the circuit board and is sunken into the gel material.

In a preferred embodiment, the liquid crystal display module is adhesively bonded to the circuit board with an electrically conductive adhesive which electrically connects the transparent electrode material of the first substrate with an electrical lead on the circuit board.

In another preferred embodiment, the second substrate is offset from the first substrate to expose the plural bonding pads, which are electrically connected to the corresponding electrical leads on the circuit board via wire bonds.

BRIEF DESCRIPTION OF THE DRAWING(S)

FIG. 4 is a simplified, exploded view summarizing the construction of an assembly of this invention.

In this specification, numerals repeated from one figure to another denote like elements.

DESCRIPTION OF THE PREFERRED EMBODIMENTS

Figure 1:
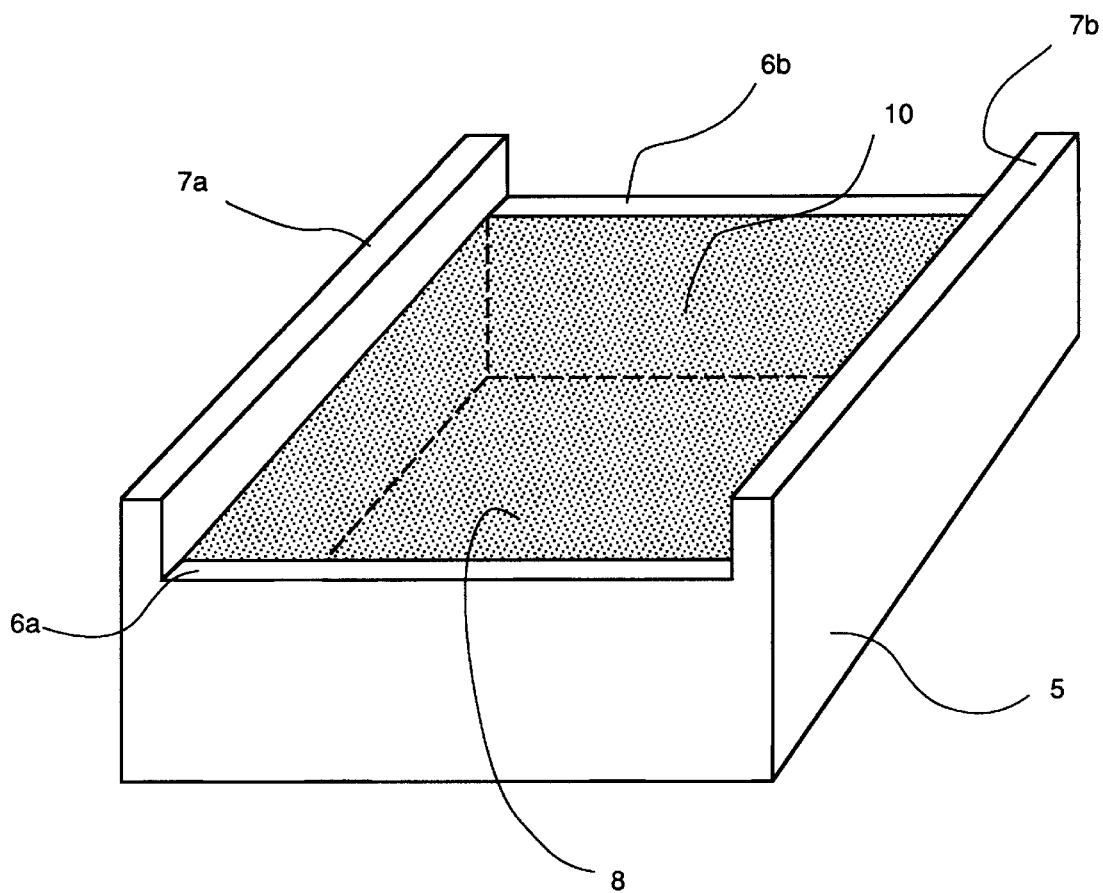
FIG. 1 shows a base for forming an assembly of this invention.

FIG. 1 shows a base 5 for receiving a liquid crystal display module and forming an assembly according to this invention. Base 5 is shown in a preferred substantially rectangular shape, having pairs of opposing walls 6a and 6b and 7a and 7b. Other shapes, e.g., bowl-shaped, hexagonal, square, and the like are permissible. For reasons discussed later, the second pair of opposed walls 7a and 7b rise higher than walls 6a and 6b. Base 5 has a cavity 8 which contains (and preferably is substantially filled with) a thermally conductive, electrically non-conductive gel material 10.

Figure 2:
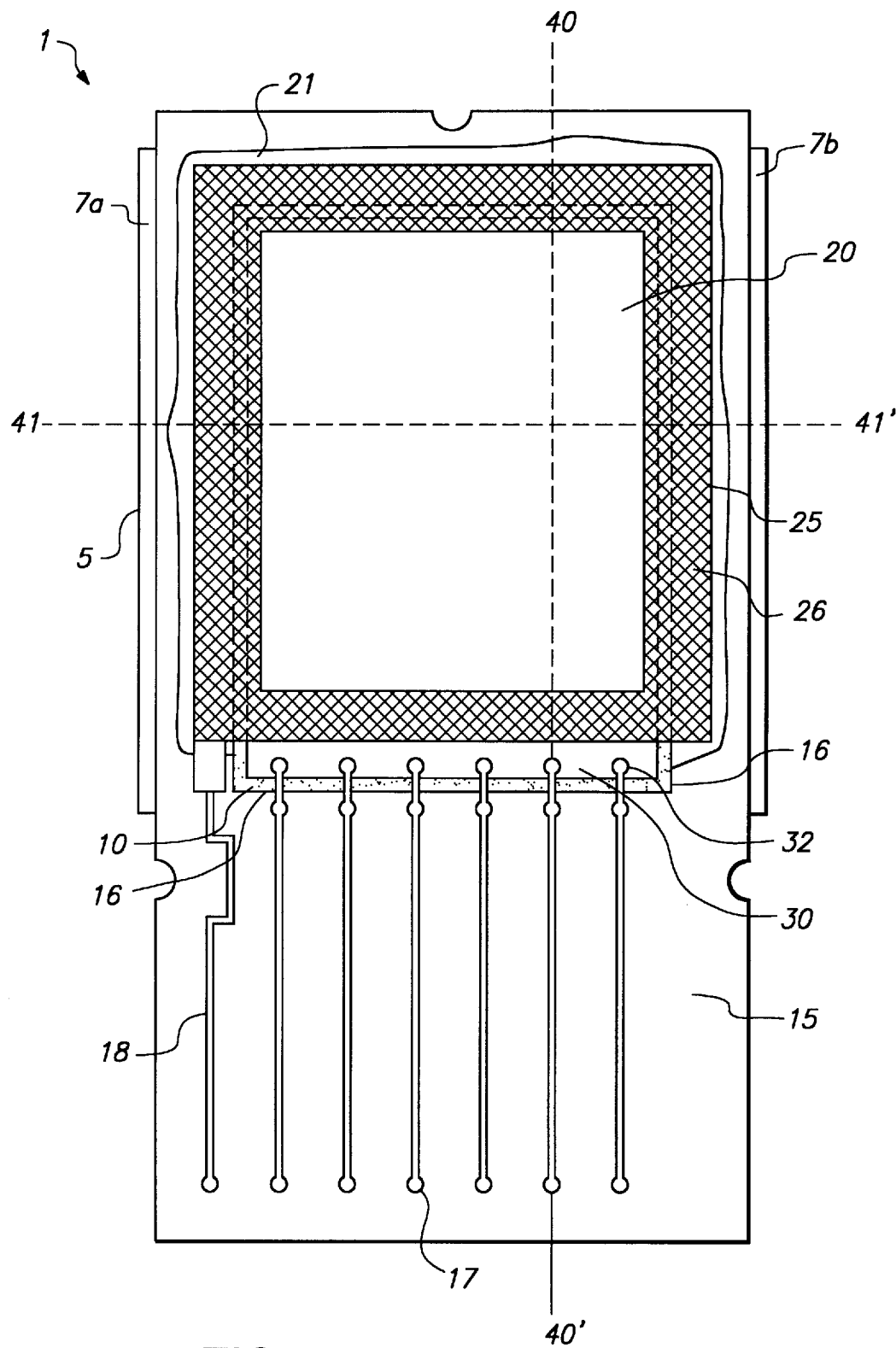
FIG. 2 shows an assembly of this invention.
Figure 3A:
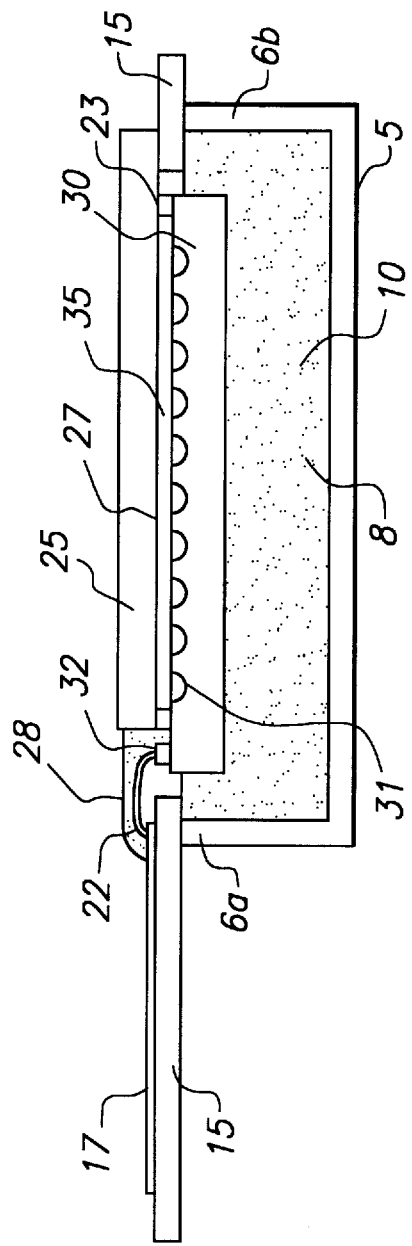
FIGS. 3a and 3b are cross-sectional views of the assembly.
Figure 3B:
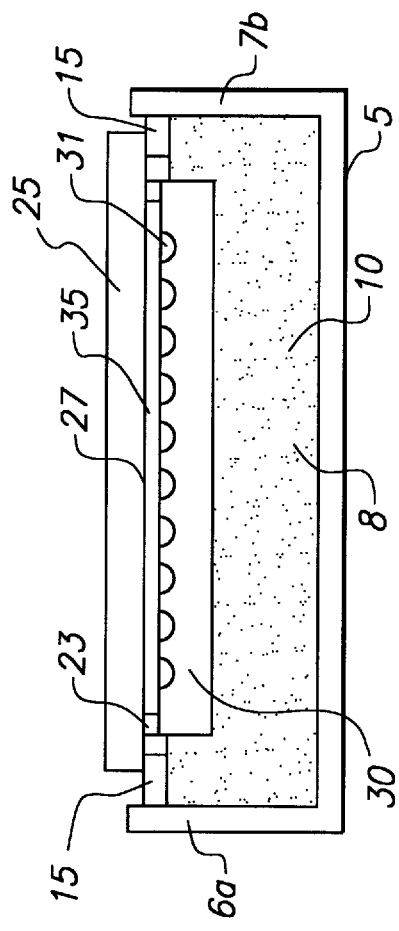

Reference is now made to FIGS. 2, 3a, and 3b, showing an assembly 1 according to this invention. FIG. 2 is a plan view, while FIGS. 3a and 3b are cross-section views along longitudinal line 40-40' and latitudinal line 41-41', respectively, of FIG. 2 and show some elements not visible in FIG. 2. In FIG. 2, base 5 is largely obscured, with only the top edges of walls 7a and 7b showing. A circuit board 15 rests on base 5, being supported by walls 6a and 6b. Walls 7a and 7b serve as alignment guides and/or as bracing elements for circuit board 15. An adhesive (e.g., an epoxy) or a mechanical fastener such as a clamp or an alignment pin (passing through a corresponding hole in circuit board 15) may be used to secure circuit board 15 in place. It is to be understood that where it is stated herein that a component rests on or is supported by another component (in this particular instance, the components being circuit board 15 and base 5) such a statement includes the instance in which one component is secured to the other one by an adhesive, even though the adhesive lies between the two components and they do not directly physically contact each other. Circuit board 15 contains a window or through-hole 16 and is positioned such that window 16 lies above gel material 10. (The obscured portions of window 16 in FIG. 2 are shown in continuation as dashed lines.)

The assembly further includes a liquid crystal display module 20, comprising a first (or front) substrate 25 and a second (or rear) substrate 30, oriented in a generally face-to-face relationship and sandwiched together (with the obscured portions of the latter shown in continuation as dashed lines). The edges of first substrate 25 extend beyond second substrate 30 along three sides and rest on circuit board 15 and are thus supported thereby. Module 20 may be secured in place via an adhesive 21 bonding top substrate 25 to circuit board 15. Alternatively, mechanical fasteners may be used. The assembly is shown here in the preferred configuration in which first substrate 25 (and hence module 20) is supported along three edges, but such three-edge support is not mandatory. Two-edge support, for example along one longitudinal and one latitudinal edge or along two longitudinal edges, may be employed. Or, first substrate 25 may be attached to circuit board 15 along one edge only, in a cantilevered construction. Second substrate 30 drops down through window 16 to sink into gel material 10. Because gel material 10 is soft and highly elastomeric, it readily deforms to accommodate second substrate 30 while maintaining good thermal contact therewith, as shown in FIGS. 3a and 3b. There may a gap between second substrate 30 and the sides of window 16, to facilitate insertion and to allow for thermal expansion of second substrate 30. There may be a gap along all four sides, as shown, but it is normally sufficient if there is a gap along each dimension—that is, second substrate may abut window 16 along one longitudinal and one latitudinal edge. A gap of at least about 0.5 mm generally suffices. A mask 26 on first substrate 25 defines the active display area. Where second substrate 30 is made of a semiconductor material, mask 26 also serves to prevent light from reaching it and causing undesirable photoconduction. Mask 26 may be formed by sputtering black chrome onto the top surface of first substrate 25, painting an ink thereon, or overlaying a separate masking element.

First substrate 25 is made of a relatively rigid transparent material such as glass and carries on its interior face (i.e., facing second substrate 30) a thin layer of a transparent electrode material 27 (FIGS. 3a and 3b), such as indium tin oxide (ITO) or a thin metal coating, which serves as a ground plane electrode for module 20. Second substrate 30 carries on its interior face a plurality of active matrix elements 31 and, together with substrate, sandwiches a liquid crystal material 35 (FIGS. 3a and 3b). Electrode material 27 and switching elements 31 face inwards, towards liquid crystal material 35. An edge sealant 23 may be used to keep liquid crystal material 35 in place. As previously discussed, switching elements 31 control the application or not of an electric field across liquid crystal material 35 which is immediately adjacent thereto and hence its electro-optical state, thus defining a pixel. Second substrate 30 is slightly offset from first substrate 25, exposing bonding pads 32. Bonding pads 32 are electrically connected via wire bonds 22 to corresponding electrical leads (or traces) 17 on circuit board 15 and thence to drive electronics for controlling the switching of active matrix elements 31. Instead of wire bonds 22, electrical connection may be made with conductive adhesive. For protection, wire bonds 22 may be encapsulated with a soft sealing material 28, such as silicone. A less flexible encapsulant, such as epoxy, is not as desirable. Electrode material 27 is electrically connected to an electrical lead 17 to drive electronics. If adhesive 21 is electrically conductive (e.g., a conductive epoxy adhesive) then it can perform the dual role of electrically connecting electrode material 27 to lead 17 and bonding module 20 to circuit board 15. Otherwise, another electrical connecting means such as solder, wire bond, and the like may be used. Second substrate 30 also includes a reflector means for reflecting light transmitted through liquid crystal material 35, so that the image formed thereon can be viewed, either directly or after projection onto a screen. The reflector means can be the surface of second substrate 30 itself, polished smooth, or it may be a separate reflector element.

The assembly of this invention allows for effective heat dissipation because second substrate 30 makes good thermal contact with gel material 10, which, being thermally conductive, conducts heat away from module 20. Base 5 itself is preferably made of a thermally conductive material having a thermal conductivity greater than 50 watt/m-°K., for example a metal such as aluminum (about 250 watt/m-°K.) or a thermally conductive composite, and may be mounted on or bonded to additional heat sink hardware. Because of the intervening gel material 10, any mechanical stresses which may consequently develop in base 5 are not transmitted to liquid crystal material 35.

FIG. 4 is a simplified, exploded view of assembly 1, summarizing how base 5, circuit board 15, and liquid crystal display module 20 come together to form the assembly. For clarity, some details have been omitted.

Gel material 10 may be based on a polymer such as silicone (also known as polysiloxane or organopolysiloxane), polyurethane, polyurea, an anhydride-containing polymer, styrene-ethylene butylene-styrene (SEBS) block polymer, and styrene-ethylene propylene-styrene (SEPS) block copolymer.

Preferably, the gel material is a silicone gel based on polydimethylsiloxane (PDMS) and prepared by the platinum-catalyzed reaction between a vinyl-functionalized PDMS and a hydride-functionalized PDMS. Such gels can be formed in a number of ways. One method synthesizes the crosslinked polymer in the presence of a non-reactive extender fluid, e.g. trimethylsiloxy-terminated PDMS. An alternative method fabricates the silicone gel by reacting a stoichiometric excess of a multifunctional vinyl-substituted silicone with a multifunctional hydride-substituted silicone in such a fashion that a soft, fluid-extended system is obtained. In the latter approach, a vinyl-rich sol fraction is obtained. Of course, combination systems are possible. Suitable examples of either of these gel systems are taught in, inter alia, Debbault, U.S. Pat. No. 4,600,261 (1986); Debbault, U.S. Pat. No. 4,634,207 (1987); Debbault, U.S. Pat. No. 5,357,057 (1994); Dubrow et al., U.S. Pat. No. 5,079,300 (1992); Dubrow et al., U.S. Pat. No. 4,777,063

(1988); and Nelson, U.S. Pat. No. 3,020,260 (1962); all incorporated herein by reference. Silicone gel systems based on alternative cure techniques such as peroxide, UV light, and high energy radiation may also be used.

Especially preferred are soft, tough, tacky, high elongation silicone gels which exhibit reduced fluid exudation. In an electronic application such as the present one, the exudation of extender fluid from the gel material (also referred to as fluid migration or bleed-out) is undesirable because it contaminates the surrounding environment with a thin liquid film.

A preferred low-exudation silicone gel can fabricated by the chain extension of a divinyl silicone material in the presence of a cross-linker and a chain extender to create a high molecular weight sol, such that the weight average molecular weight ($M_w$) of the extractable fluid is at least 100,000 g/mol. (The extractable fluid consists of the sol and nonreactive diluent present in the formulation, if any.) The gel material is preferably fabricated with 0 to 40 weight % added inert extender diluent. An alternative synthetic method is to use a diluent with $M_w$ of at least 100,000 g/mol, but then the initial (uncured) viscosity is greater than 50,000 cP, which may make filling the base more difficult. Generally, these silicone gels preferably have a hardness of 10 to 1,000 g (more preferably 10 to 500 g), a tack of 5 to 250 g (a tackier gel leading to better thermal contact), an ultimate elongation of greater than 500%, a stress relaxation 20 to 95%, and a toughness of greater than 10 in-lb/in$^3$. These properties enable the gel material to be highly deformable to accommodate the liquid crystal display module and maintain good thermal contact without imparting undesirable mechanical stress thereto. A softer gel will place less stress on module 20 but a filled gel tends to be harder than the corresponding unfilled gel, so that some balancing between desired softness and the amount of conductive filler needed to provide the desired thermal conductivity may be needed, with consideration given the characteristics of the polymer system on which the gel is based and the thermal conductivity of the filler.

Where it is contemplated to fill the base after assembly with the circuit board and the liquid crystal display module, the initial, uncured viscosity should be less than 10,000 centipoise cP, preferably less than 5,000 cP, and most preferably less than about 4,000 cP.

Further details on the preparation and characterization of low-exudation silicone gels are found in copending, commonly assigned U.S. patent application of Craig et al., Ser. No. 08/573,163, filed Dec. 15, 1995, the disclosure of which is incorporated herein by reference.

The gel material may be rendered thermally conductive by the inclusion of an electrically non-conductive, thermally conductive particulate filler such as aluminum oxide (alumina), silicon carbide, zinc oxide, aluminum nitride, ferric oxide, beryllium oxide, titanium dioxide, magnesium oxide, boron nitride, and the like. The filler should have a thermal conductivity of at least 1 watt/m-°K., preferably at least 10 watts/m-°K. A preferred filler is aluminum oxide. Illustrative disclosures relating to the preparation of thermally conductive gel materials include Dittmer et al., U.S. Pat. No. 4,852,646 (1989), and Raychem, WO 96/05602 (1996); the disclosures of which are incorporated herein by reference. The amount of the filler is widely variable, but should be in an amount sufficient to impart to the gel material a thermal conductivity of at least 0.5 watt/m-°K., more preferably at least 1.0 watt/m-°K. Generally, the filler will be present in an amount of between about 5 and about 70 weight %, based on the combined amounts of gel material and filler.

Specifically, the following formulation of a silicone gel material filled with aluminum oxide has been used. This formulation, which did not contain any inert diluent, was composed of two parts, a part A and a part B, which were mixed to initiate cure.

Part A's constitution was:

| Component Description | Amount (g) |
|---|---|
| Vinyl-terminated PDMS (RTV645, from General Electric) | 50.000 |
| Platinum catalyst (2.4% platinum in solution, Huls PC075) | 0.041 |
| Vinylmethylcyclic siloxane inhibitor (PCR 77M10S) | 0.014 |

Part B's constitution was:

| Component Description | Amount (g) |
|---|---|
| Vinyl-terminated PDMS (RTV645, from General Electric) | 43.378 |
| Tetrakis(dimethylsiloxy)silane Hydride Containing Crosslinker (Pfaltz & Bauer T06345) | 0.310 |
| Chain Extender (United Chemical Technology PS537) | 1.315 |

A loading of 65 wt % aluminum oxide (C-75 fine alumina from Alcan) was used, the percentage being based on amount of aluminum oxide plus Parts A and B. The gel material so produced had a thermal conductivity of about 1.1 watt/m-°K., a hardness of about 492–496 g, a tack of about 132 to 140 g, and a stress relaxation of about 64%.

Base 5 may be filled with gel material 10 first, for example by filling cavity 8 with uncured gel which is allowed to cure in situ. Then, the rest of the assembly, including insertion of liquid crystal display module 20, is completed. Alternatively, the assembly may be completed but for the introduction of gel material 10. Then, gel material 10, in its uncured form, is introduced into the cavity through the gap between liquid crystal display module 10 and window 16 (or through an optional filling hole) and allowed to cure. In yet another embodiment, a piece of already-cured gel material 10, cut from a larger piece, can be fitted inside the cavity and then the assembly is completed.

Second substrate 30 preferably is a silicon wafer on which the active matrix elements have been formed using standard semiconductor fabrication techniques, for example a MOS chip. The surface of the wafer is polished smooth to provide a reflective surface for reflecting light passing through liquid crystal material 35. However, the present invention is not limited to silicon wafers and may be used for other active matrix systems, for example thin film transistors (TFT's) on glass or active matrix elements such as diodes, varistors, or MIM's carried on other types of substrates.

One type of liquid crystal display for which the present invention is especially suitable employs a liquid crystal composite comprising plural volumes (or droplets) of a liquid crystal material contained (i.e., dispersed, encapsulated, or embedded) within a polymer matrix. Such composites have been referred to in the art alternatively as nematic curvilinear aligned nematic (NCAP) materials or as polymer dispersed liquid crystal (PDLC) materials. Exemplary disclosures include Fergason, U.S. Pat. No. 4,435,047 (1984); West et al., U.S. Pat. No. 4,685,771 (1987); Pearlman, U.S. Pat. No. 4,992,201 (1991); Andrews et al., U.S. Pat. No. 5,202,063 (1993); Kamath et al., U.S. Pat. No. 5,233,445 (1993); Reamey, U.S. Pat. No. 5,328,850 (1994); Reamey et al., U.S. Pat. No. 5,405,551 (1995); Wartenberg et al., U.S. Pat. No. 5,427,713 (1995); Raychem WO 95/25777 (1995); Reamey et al., U.S. Pat. No. 5,543,944 (1996); Raychem WO 96/19547 (1996); Raychem, WO 96/20986 (1996); and Dainippon Ink, EP 0,313,053 (1989); the disclosures of which are incorporated herein by reference. Generally, such composites are light scattering and/or absorbing in the absence of a sufficient electric field (the field-off state), but are substantially light transmissive in the presence of such electric field (the field-on state). The present invention is particularly advantageous with NCAP/PDLC materials, as they are susceptible to stress-whitening even at fairly low stress levels.

Other types of liquid crystal displays can also be used with the present invention, for example displays of the popular twisted-nematic (TN) design and variants thereof, such as super-twist designs.

In an exemplary procedure, an assembly of this invention was prepared as follows: a base was cleaned and degreased. A pre-cut pad of gel material of the Part A/B type described above was inserted into the cavity of the base, taking care to avoid contamination of the gel surface. The circuit board was placed over the base, checking for proper alignment of the window in the circuit board over the gel material. A quick curing, 5-minute epoxy was applied to the edges of the circuit board to glue it to the base. Meanwhile, in a separate procedure, a black mask cover glass was laminated to a MOS-based liquid crystal display module. An electrically conductive, flexible, silver filled epoxy adhesive (Ablebond 9976-1 from Ablestick) was applied to the edges of the module. After aligning the MOS element so that it was centered over the window, the module was pressed down on the circuit board to ensure good contact of the MOS pad with the gel material and of the epoxy adhesive with the edges of the circuit board around the window. The Ablebond epoxy was then cured for 4 hr at 100° C. Next, wire bond connections were made between the circuit board and the module, followed by encapsulation of the wire bonds with a soft silicone encapsulant.

In an alternative procedure, substantially the same steps were followed, except that the base, circuit board, and module were assembled together first, and then the uncured gel material was injected into the cavity in the base with a syringe, via an optional filling hole in the base, and allowed to cure for 2–4 hr at 40° C. Afterwards, the filling hole was taped shut.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:
1. An assembly comprising:
   (a) a base having a cavity;
   (b) a thermally conductive, electrically non-conductive gel material contained in the cavity;
   (c) a circuit board having a window therein and plural electrical leads thereon, the circuit board being supported on the base and positioned such that the window lies above the gel material; and
   (d) a liquid crystal display module, including
      (i) first and second substrates oriented in a generally face-to-face relationship, wherein the first substrate is transparent and has on its interior face a transparent electrode material electrically connected to an electrical lead on the circuit board and wherein the second substrate has on its interior face a plurality of active matrix elements and has plural bonding pads electrically connected to corresponding electrical leads on the circuit board; and
      (ii) liquid crystal material sandwiched between the first and second substrates;
   wherein the first substrate is supported on the surface of the circuit board facing away from the base and wherein the second substrate passes through the window in the circuit board and is sunken into the gel material.

2. An assembly according to claim 1, wherein the second substrate is a silicon wafer.

3. An assembly according to claim 2, wherein the liquid crystal material in the liquid crystal display module comprises a liquid crystal composite in which plural volumes of liquid crystal material are contained in a polymer matrix.

4. An assembly according to claim 3, wherein the gel material is a silicone gel having a thermal conductivity of at least about 1.0 watt/m-°K.

5. An assembly according to claim 3, wherein the gel material is a silicone gel filled with aluminum oxide in an amount between 5 and 70 weight % alumina, based on the combined weights of aluminum oxide and silicone.

6. An assembly according to claim 3, wherein the base is made of a material having a thermal conductivity greater than 50 watt/m-°K.

7. An assembly comprising:
   (a) a base having a cavity;
   (b) a thermally conductive, electrically non-conductive gel material contained in the cavity;
   (c) a circuit board having a window therein and plural electrical leads thereon, the circuit board being supported on the base and positioned such that the window lies above the gel material; and
   (d) a liquid crystal display module adhesively bonded to the circuit board with an electrically conductive adhesive, the liquid crystal display module including
      (i) first and second substrates oriented in a generally face-to-face relationship, wherein the first substrate is transparent and has on its interior face a transparent electrode material electrically connected to an electrical lead on the circuit board via the electrically conductive adhesive and wherein the second substrate has on its interior face a plurality of active matrix elements and has plural bonding pads electrically connected to corresponding electrical leads on the circuit board; and
      (ii) liquid crystal material sandwiched between the first and second substrates;
   wherein the first substrate is supported on the surface of the circuit board facing away from the base and wherein the second substrate passes through the window in the circuit board and is sunken into the gel material.

8. An assembly according to claim 7, wherein the liquid crystal material in the liquid crystal display module comprises a liquid crystal composite in which plural volumes of liquid crystal material are contained in a polymer matrix.

9. An assembly according to claim 8, wherein the second substrate is a silicon wafer.

10. An assembly according to claim 9, wherein the gel material is a silicone gel having a thermal conductivity of at least about 1.0 watt/m-°K.

11. An assembly according to claim 9, wherein the gel material is a silicone gel filled with aluminum oxide in an amount between 5 and 70 weight % alumina, based on the combined weights of aluminum oxide and silicone.

12. An assembly according to claim 9, wherein the base is made of a material having a thermal conductivity greater than 50 watt/m-°K.

13. An assembly comprising:
   (a) a base having a cavity;
   (b) a thermally conductive, electrically non-conductive gel material contained in the cavity;
   (c) a circuit board having a window therein and plural electrical leads thereon, the circuit board being supported on the base and positioned such that the window lies above the gel material; and
   (d) a liquid crystal display module, including
      (i) first and second substrates oriented in a generally face-to-face relationship, wherein the first substrate is transparent and has on its interior face a transparent electrode material electrically connected to an electrical lead on the circuit board and wherein the second substrate has on its interior face a plurality of active matrix elements and has plural bonding pads electrically connected to corresponding electrical leads on the circuit board; the second substrate being offset from the first substrate to expose the plural bonding pads which are electrically connected to the corresponding electrical leads via wire bonds; and
      (ii) liquid crystal material sandwiched between the first and second substrates;
   wherein the first substrate is supported on the surface of the circuit board facing away from the base and wherein the second substrate passes through the window in the circuit board and is sunken into the gel material.

14. An assembly according to claim 13, wherein the liquid crystal display module is adhesively bonded to the circuit board with an electrically conductive adhesive which forms an electrical connection between the transparent electrode material of the first substrate and an electrical lead on the circuit board.

15. An assembly according to claim 14, wherein the second substrate is a silicon wafer.

16. An assembly according to claim 15, wherein the liquid crystal material in the liquid crystal display module comprises a liquid crystal composite in which plural volumes of liquid crystal material are contained in a polymer matrix.

17. An assembly according to claim 16, wherein the gel material is a silicone gel having a thermal conductivity of at least 1.0 watt/m-°K.

18. An assembly according to claim 16, wherein the gel material is a silicone gel filled with a thermally conductive filler selected from the group consisting of aluminum oxide, silicon carbide, zinc oxide, aluminum nitride, ferric oxide, beryllium oxide, titanium dioxide, magnesium oxide, and boron nitride.

19. An assembly according to claim 16, wherein the gel material is a silicone gel filled with aluminum oxide in an amount between 5 and 70 weight % alumina, based on the combined weights of aluminum oxide and silicone.

20. An assembly according to claim 16, wherein the base is made of a material having a thermal conductivity greater than 50 watt/m-°K.

* * * * *